United States Patent [19]
Wilson et al.

[11] Patent Number: 5,619,599
[45] Date of Patent: Apr. 8, 1997

[54] REMOTE SPLIT SCAN DETECTOR

[75] Inventors: James M. Wilson, Glendora; Girmay K. Girmay, La Mirada, both of Calif.

[73] Assignee: Xerox Corporation, Stamford, Conn.

[21] Appl. No.: 439,841

[22] Filed: May 12, 1995

[51] Int. Cl.$^6$ .................................................. G02B 6/00
[52] U.S. Cl. ............................ 385/12; 385/31; 385/146; 250/227.28
[58] Field of Search ................................ 385/12, 146, 31, 385/123, 133; 250/227.14, 227.28

[56] References Cited

U.S. PATENT DOCUMENTS

| | | | |
|---|---|---|---|
| 5,106,181 | 4/1992 | Rockwell, III | 385/116 |
| 5,165,005 | 11/1992 | Klainer et al. | 385/12 |
| 5,224,198 | 6/1993 | Jachimowicz et al. | 385/133 |
| 5,323,477 | 5/1994 | Lebby et al. | 385/133 |
| 5,439,647 | 8/1995 | Saini | 385/12 |

FOREIGN PATENT DOCUMENTS

| | | | |
|---|---|---|---|
| 57-79472 | 5/1982 | Japan | 385/12 |

*Primary Examiner*—Rodney B. Bovernick
*Assistant Examiner*—Yisun Song

[57] ABSTRACT

A remote split scan detector is disclosed which utilizes two rectangular cross section light pipes to transfer the light beam from a raster output scanner (ROS) housing onto two light sensors outside of the housing. Each one of the light pipes is designed to receive a light beam at its input end and transfer the light beam to an output end where the light beam exits the light pipe through a diffused portion of a side wall. Two sensors are placed in such a manner that each faces one diffused surface to receive the light beam exiting the diffused surface.

6 Claims, 5 Drawing Sheets

REMOTE SPLIT SCAN DETECTOR

BACKGROUND OF THE INVENTION

This invention relates to a remote split scan detector, and more particularly, to a remote split scan detector which utilizes two rectangular cross section light pipes to transfer a light beam onto two light detecting sensors. The remote split scan detector of this invention is used in a raster scanning system in order to detect the start of the scan and end of scan positions. Hereinafter "light detecting sensor" will be referred to as "sensor".

Typically a raster output scanner (ROS) needs a start of scan pulse in order to trigger the electronics to send the video stream at a precise time which corresponds to a precise location for the light exposure on a desired medium.

There are different kinds of scan detectors such as single sensor knife edge and dual sensor split scan detector which can be used to detect start of scan and end of scan. Dual sensor split scan detectors are more accurate since they are insensitive to beam intensity variations. Hereinafter, dual sensor split scan detectors will be referred to as "split scan detector". Split scan detectors are usually placed in the ROS housing. Typically, two mirrors are placed in the path of the scanning light beam at the output window of the raster output scanner one prior to the start of scan and the other at the end of scan line. Each mirror reflects the scanning light beam onto one split scan detector. The detector which receives the light beam from the mirror prior to the start of scan detects the start of scan and the detector which receives the light beam from the mirror at the end of scan detects the end of scan. Some systems use only the start of scan detector and some systems use only the end of scan detector.

For the purpose of simplicity, hereinafter a generic scan detector will be discussed since the discussion of the generic scan detector applies to both the start of scan detector and the end of scan detector.

Placing the split scan detector in the housing of the raster output scanner creates some difficulties. The split scan detector has two sensors spaced apart from each other in such a manner that the two adjacent edges are parallel to each other. Typically, the space between the two sensors is less than the diameter of the light beam. Since the sensors are in the path of the scanning light beam, the light beam crosses both sensors. Every time the light beam exits one sensor, crosses the space between the two sensors and enters the second sensor, a pulse will be generated. Each split scan detector has an associating comparator circuit.

The main electronic board is usually outside of the raster output scanner housing. However, the comparator circuit associated with each split scan detector has to be placed in the raster output scanner housing next to each split scan detector. Therefore, two small circuit boards each containing two sensors of a split scan detector and its associated comparator circuit are placed inside the raster output scanner housing. The two detector circuit boards have to be hard wired to the main electronic board.

It is not desirable to have electronic circuits away from the main electronic board since having additional circuit boards adds considerably to the cost of manufacturing.

There has been an attempt to solve this problem by placing detectors on the main electronic board and transferring the reflected scanning light beam onto the electronic board via light pipes. However, in this approach single sensor detectors are used. Since each detector has one sensor, this approach uses one circular cross section light pipe for each detector to transfer the light beam from the ROS housing onto the sensor in the main electronic board and the light pipe is used in such a manner that one end of the light pipe is attached to the sensor and the other end of the light pipe is placed in the ROS housing. Therefore, every time the light beam crosses the circular end of the light pipe in the ROS housing, the light beam will be transferred to the sensor on the main electronic board and the sensor will generate a pulse.

This approach is less accurate than a split scan detector approach because it is sensitive to variations in beam intensity.

It is an object of this invention to transfer the reflected scanning light beam from the ROS housing onto a split scan detector at a different location than the ROS housing with a high accuracy.

SUMMARY OF THE INVENTION

In accordance with the present invention, a remote split scan detector is disclosed which utilizes two rectangular cross section light pipes to transfer the light beam from a raster output scanner (ROS) housing onto two remote sensors. Each one of the rectangular cross section light pipes has an input end and an output end. The input end of each rectangular cross section light pipe is placed in the ROS housing to receive a light beam and the output end is placed outside of the ROS housing. The light pipe transfers the received light beam from the input end to an output end where the light exits a diffused portion of a side wall at the output end. Two light detecting sensors are placed in such a manner that each faces one diffused surface to receive the light beam exiting from the diffused surface.

DESCRIPTION OF THE PREFERRED EMBODIMENT

One approach to utilize a split scan detector and place it on the main electronic board is to utilize two circular cross section light pipes (fiber optics) to transfer the light beam from the ROS housing onto the sensors on the main electronic board.

Figure 1:
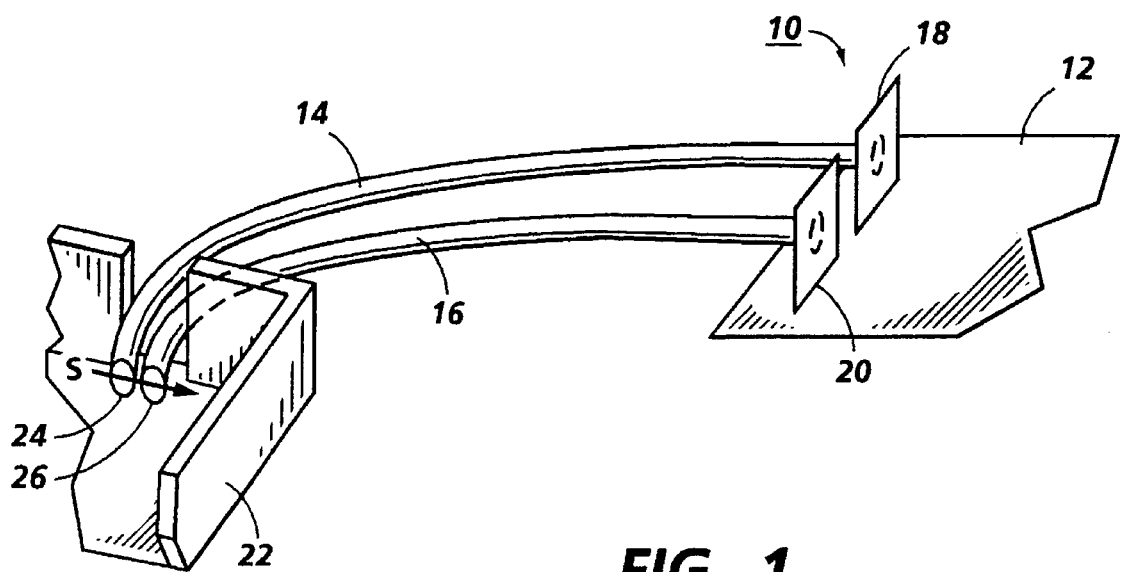
FIG. 1 shows a split scan detector which utilizes two circular cross section light pipes to transfer the light beam from a ROS housing onto the sensors on an electronic board away from the ROS housing.

Referring to FIG. 1, there is shown a split scan detector 10, which is located on the main electronic board 12 and two circular cross section light pipes 14 and 16 are used in such a manner that one end of each light pipe will be facing one of the sensors 18 and 20 of the split scan detector 10 and the other end of each light pipe will be placed in the ROS housing 22. The two ends 24 and 26 of the light pipes 14 and 16 in the ROS housing are spaced from each other and they are placed in the path of the reflected scanning light beam S. Therefore, every time the light beam crosses over the end 24 of one light pipe 14, crosses over the space between the two light pipes 14 and 16 and starts crossing the end 26 of the other light pipe 16, the sensors 18 and 20 cause the detector 10 on the main electronic board 12 to generate a pulse.

Figure 2:
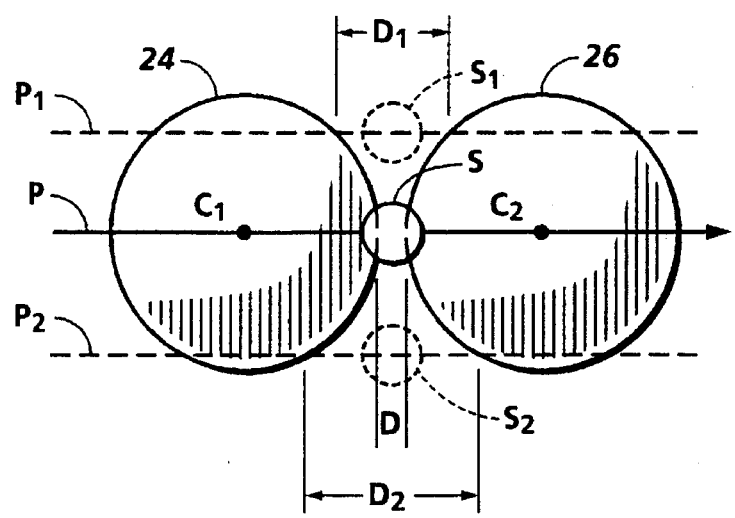
FIG. 2 shows the ends of two circular cross sectional pipelines and the varying space between them above or below the line which connects the centers of the two circular ends.

This approach is less accurate than a split scan detector. Since the ends of the light pipes are circular, the space between them is not uniform. Therefore, referring to FIG. 2, in order to have an accurate start of scan or end of scan detection, the light beam shown by spot S has to be aligned to cross the two circular ends 24 and 26 of the light pipes on a path P which connects the centers $C_1$ and $C_2$ of the two circular ends 24 and 26. It should be noted that hereinafter "a light beam crossing the ends 24 and 26 on a given path" shall mean that "the center of the spot of that light beam crosses ends 24 and 26 on that given path".

This alignment is not a practical alignment since the light beam will have a different position for each scan line based on different abnormalities of each facet of the rotating polygon mirror. Therefore, it is common that the light beam passes the two circular ends 24 and 26 of the light pipes on a path which is above or below path P. For example, the light beam may pass the two circular ends 24 and 26 of the light pipes on path $P_1$ or path $P_2$. When the light beam shown by spot $S_1$ is on path $P_1$, the distance $D_1$ between the two circular ends 24 and 26 is larger than the distance D between the two ends 24 and 26 on path P. Also, when the light beam shown by spot $S_2$ is on path $P_2$, the distance $D_2$ between the two circular ends 24 and 26 is larger than the distance D between the two ends 24 and 26 on path P. Furthermore, depending on how far the light beam is above or below path P the distance between the two circular ends changes. Therefore, depending on the position of the path of the light beam, the start of scan pulse or the end of scan pulse will be generated at a different time than the intended time. It should be noted that spots S, $S_1$ and $S_2$ denote the same spot at different positions.

In order to preserve the high accuracy of the split scan detector and place the split scan detector on the main electronic board, in this invention two rectangular cross sectional light pipes are utilized.

Figure 3:
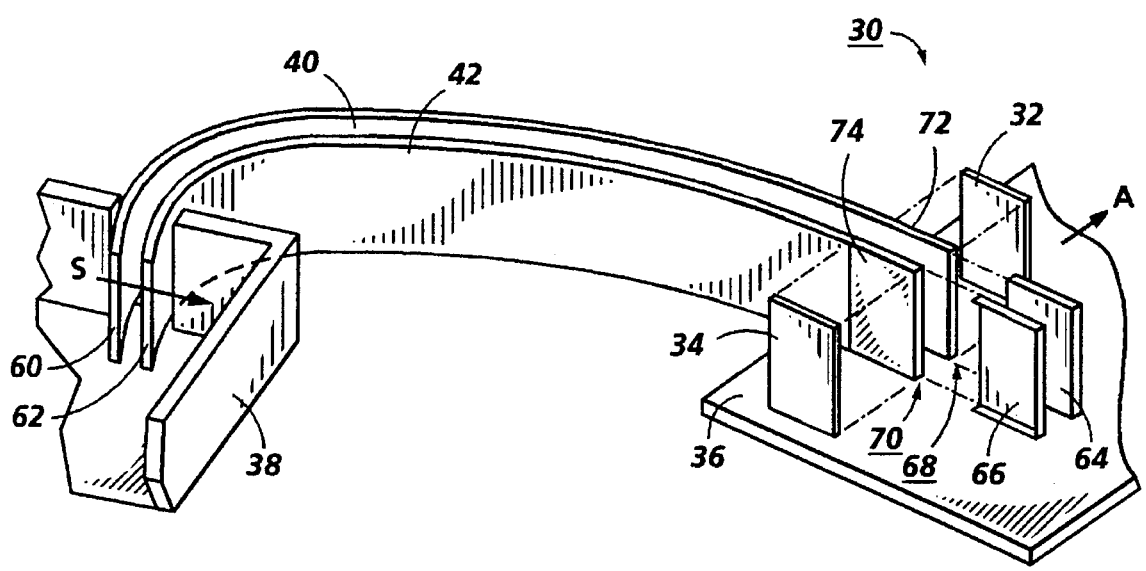
FIG. 3 shows a split detector of this invention in which two rectangular cross section light pipes are utilized to transfer the light beam from a ROS housing onto two sensors on an electronic board away from the ROS housing.

Referring to FIG. 3, there is shown a split scan detector 30 of this invention. In this invention, all the electronics needed for a raster output scanner (not shown), the sensors 32 and 34 of the split scan detector 30 and the comparator circuit (not shown) are all placed on one main electronic board 36. Since the main electronic board 36 is located away from the raster output scanner (ROS) housing 38, the light has to be transferred from the ROS housing 38 onto the sensors 32 and 34 on the main electronic board 36.

In this invention two rectangular cross section light pipes 40 and 42 are utilized to transfer the light from the ROS housing 38 onto the sensors 32 and 34. Rectangular cross section light pipes are well known in the industry.

Figure 4:
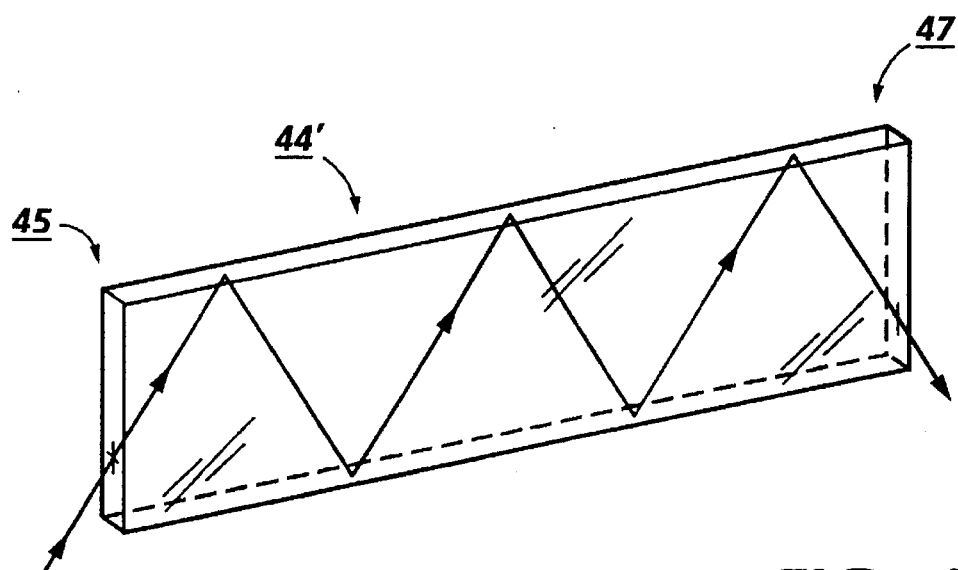
FIG. 4 shows the propagation of a light beam within a rectangular cross section light pipe.

Referring to FIG. 4, typically a rectangular cross section light pipe 44 is used in the same manner as a circular cross section light pipe (fiber optic) meaning that the light enters the light pipe and is transferred from an input end 45 to an output end 47.

Figure 5:
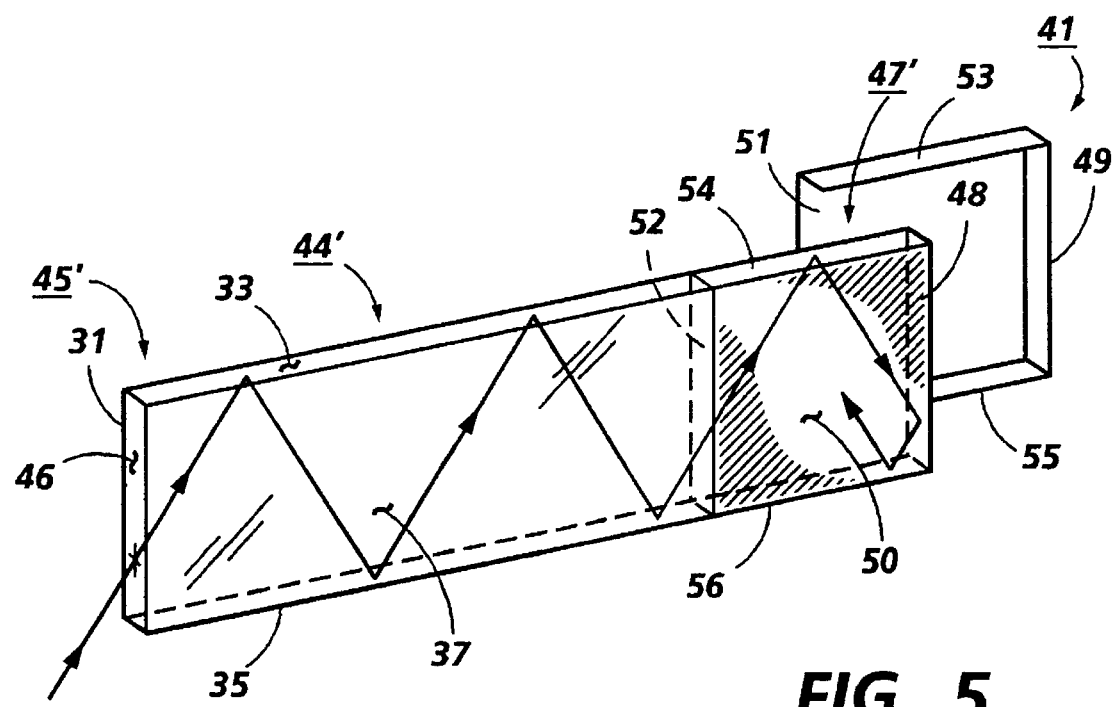
FIG. 5 shows a rectangular cross section light pipe which is modified to be used in the split scan detector of this invention.

However, referring to FIG. 5, in this invention, the light enters the light pipe 44' from an input end wall 46 at an input end 45' and will be transferred to an output end 47' where it exits the light pipe 44' from a portion 50 of a side wall 37. A reflector 41 covers the light pipe 44' at the output end 47 on all walls except on wall 37. For the purpose of clarity, reflector 41 is shown at a distance from the light pipe 44'. However, reflector 41 and the light pipe 44' are in contact with each other. The edge wall 49 of the reflector 41 covers a terminating end wall 48 of the light pipe 44', the side wall 51 of the reflector 41 covers a portion 52 of a side wall 31 of the light pipe 44' and the edge walls 53 and 55 each covers a portion 54 of the top wall 33 and a portion 56 of a bottom wall 35 of the light pipe 44' respectively.

The reflector 41 causes the light beam from the terminating end wall 48, the portions 52, 54 and 56 to be reflected onto portion 50. The reflection from the terminating end wall 48, portions 52, 54 and 56 cause the intensity of the light beam exiting portion 50 to increase. The portion 50 from which the light exits has been diffused in order to disperse the light beam.

It should be noted that covering the top portion 54 and the bottom portion 56 of the light pipe 44' with a reflector is not necessary. However, covering the portions 54 and 56 with a reflector improves the intensity of the light exiting the light pipe 44'.

It should also be noted that the reflector 41 in FIG. 5 can be replaced by a layer of reflective coating material on each wall.

It should further be noted that in FIG. 5, for the purpose of simplicity, the length of the light pipe 44' is decreased. However, the length of the light pipe 44' is a matter of choice and the light pipe 44' can perform the same function at any length.

Referring back to FIG. 3, the input end walls 60 and 62 of the two light pipes 40 and 42 are placed in the ROS housing 38 adjacent to each other and the two light pipes 40 and 42 extend outside of the ROS housing 38 onto the electronic board 36. The light transmitting input end walls 60 and 62 are placed side by side and the edges are substantially parallel to each other.

On the electronic board 36, the two light pipes 40 and 42 are placed in such a manner that the diffused surfaces 72 and 74 of the two light pipes 40 and 42 face opposite directions. Diffused surface 72 faces sensor 32 and diffused surface 74 faces sensor 34.

A reflector 64 receives the output end 68 of the light pipe 40 and a reflector 66 receives the output end 70 of the light pipe 42. For the purpose of clarity, the two reflectors 66 and 68 are shown at a distance from the two light pipes 40 and 42. However, the two reflectors should be placed on the two light pipes 40 and 42 at the output ends 68 and 70 to reflect the light beam inside each light pipe 40 and 42 onto the diffused surfaces 72 and 74 respectively. For the best results, each reflector should contact its corresponding light pipe.

Also, for the purpose of clarity, the sensors 32 and 34 are shown at a distance from the light pipes 40 and 42. Again, for the best results, the sensors 32 and 34 have to be adjacent or in a contacting position with the two light pipes 40 and 42.

It should be noted that the light pipes 40 and 42 need to be adjacent to each other only at the ends 60 and 62 where they receive the light beam. The rest of the two light pipes 40 and 42 can be placed at a distance from each other, adjacent to each other or in a contacting position. However, It should be noted that light pipes 40 and 42 have to have cladding in order to be placed at a contacting position. The light pipes should have cladding anywhere they come in contact with anything other than reflectors, diffusers or sensors.

In operation, in the ROS housing 38, the scanning light beam will be reflected onto the input end walls 60 and 62 of the light pipes 40 and 42. As the scanning light beam S crosses the input end wall 60 of light pipe 40, crosses the space between them and enters onto the input end wall 62 of the light pipe 42, the two light pipes 40 and 42 transfer the light onto the sensors 32 and 34 respectively which will then generate a pulse.

In the disclosed embodiment of this invention, since the two input end walls 60 and 62 of the light pipes 40 and 42 are parallel to each other, the space between them is fixed and therefore if the light beam is above or below the intended position, the start of scan pulse will always be generated at the same time. As a result, the split scan detector of this invention which utilizes rectangular cross section light pipes is more accurate than a split scan detector utilizing circular cross section light pipes.

Figure 6:
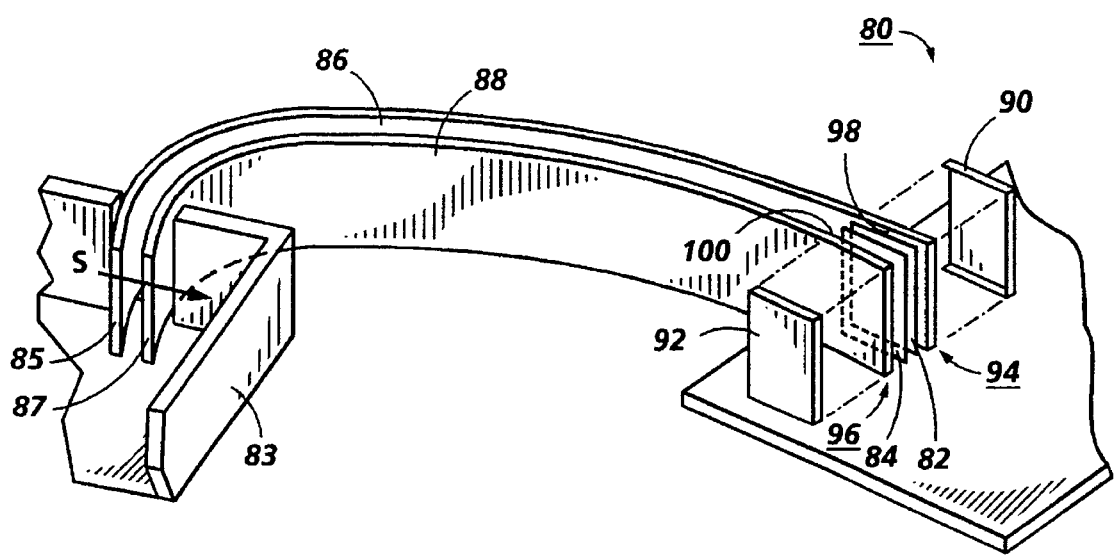
FIG. 6 shows an alternative embodiment of the split scan detector of this invention utilizing two rectangular cross section light pipes.

Referring to FIG. 6, there is shown an alternative implementation of the split scan detector of this invention. The split scan detector 80 has two sensors 82 and 84 back to back and two light pipes 86 and 88 one on each side of the back to back sensors 82 and 84. A reflector 90 receives the output end 94 and a reflector 92 receives the output end 96. The diffused surface 98 of the light pipe 86 faces the sensor 82 and the diffused surface 100 of the light pipe 88 faces the sensor 84.

In the ROS housing 83, the two input end walls 85 and 87 are placed side by side and the edges are substantially parallel to each other. Again, in the embodiment of FIG. 6, for the purpose of clarity, the reflectors 90 and 92 and the sensors 82 and 84 are placed at a distance from the two light pipes 86 and 88. However, the reflectors 90 and 92 should be in a contacting position with the light pipes 86 and 88 and the sensors 82 and 84 should be adjacent or in a contacting position with the light pipes 86 and 88.

Figure 7:
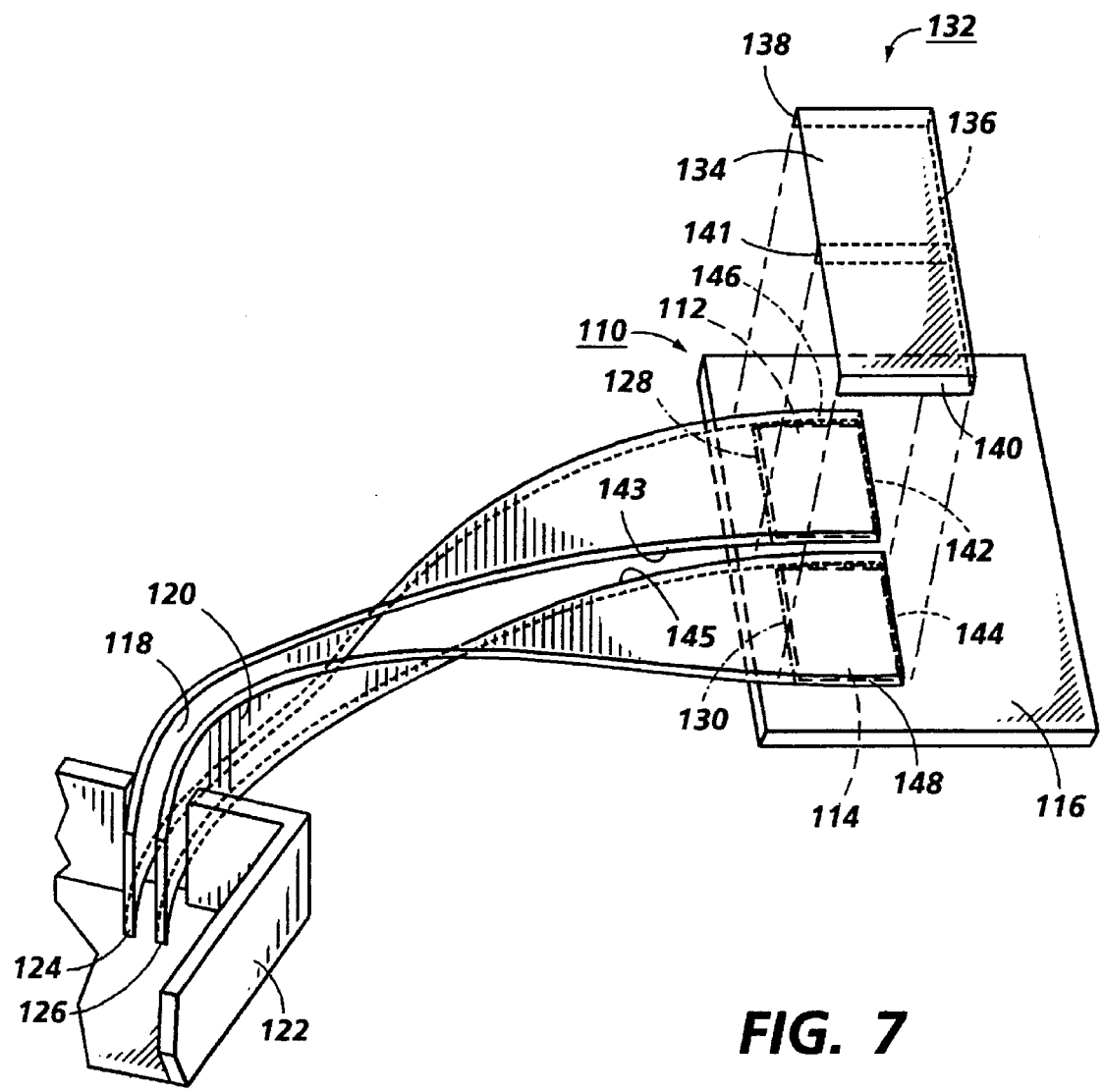
FIG. 7 shows the preferred embodiment of the split scan detector of this invention utilizing two rectangular cross section light pipes.

Referring to FIG. 7, there is shown the preferred embodiment of the split scan detector 110 of this invention. In this embodiment 110, two sensors 112 and 114 are placed flat on a main electronic board 116. The two rectangular light pipes 118 and 120 are utilized to transfer the light from the ROS housing 122. The input end walls 124 and 126 of the two light pipes 118 and 120 are placed in the ROS housing 122 side by side and the edges are substantially parallel to each other. The light pipes 118 and 120 are twisted in order to place the diffused surfaces 128 and 130 of the light pipes onto the sensors 112 and 114 respectively.

In addition, a reflector 132 which has a top plate 134, side plates 136, 138 and 140 and a divider plate 141 is placed over the two light pipes 118 and 120 in such a manner that the top plate 134 of the reflector 132 covers a portion of the two light pipes 118 and 120 and the divider plate 141 isolates a portion of side 143 of the light pipe 118 from a portion of side 145 of the light pipe 120. The divider plate 136 is reflective on both sides in order to reflect the light beam from each light pipe into the same light pipe. The edges 136, 138 and 140 of the reflector 132 will cover the terminating end walls 142 and 144, a portion of side 146 of the light pipe 118 and a portion of side 148 of the light pipe 120.

It should be noted that the two sensors 112 and 114 can be fabricated on one chip or they can be fabricated on separate chips.

It should also be noted that in the different disclosed embodiments of this invention, the reflectors can be replaced by a coating of a reflective material on each wall of the light pipes except the wall that has a diffused portion.

It should further be noted that in the different disclosed embodiments of this invention, rectangular light pipes can have cladding to increase the total reflection inside the light pipe. In addition, the light pipes must have cladding in any area where they come in contact with each other or with anything other than the reflectors, diffusers or sensors.

What is claimed is:

1. A split scan detector for detecting start of scan or end of scan in a raster output scanner comprising:

two flexible light pipes each having four walls extending in the longitudinal direction;

each light pipe being rectangular in cross section;

said rectangular cross section having two opposing sides which are substantially longer than the other two opposing sides with each of the sides corresponding to a respective one of said four walls;

one wall corresponding to one of the longer opposing sides of the rectangular cross section being a reflective wall and one wall corresponding to the other of the longer opposing sides of the rectangular cross section being an exit wall;

each light pipe having an input end and an output end;

said two light pipes each having a terminating end wall located at said output end and being connected to and transverse to said four walls and a light transmitting input end wall, for receiving a light beam, located at said input end and connected to and transverse to said four walls;

each of said two light pipes being positioned to receive a light beam at its input end and being so constructed and arranged to transfer the received light beam to said output end;

a portion of said exit wall on each light pipe being diffused at said output end;

on each of said light pipes, said terminating end wall and a portion of said reflective wall at said output end having reflective means;

on each of said light pipes, said diffused portion of said exit wall, said reflective means of said reflective wall and said reflective means of said terminating end wall being so constructed and arranged to reflect the received light beam toward said diffused portion to allow the received light beam to exit said light pipe through said diffused portion;

said diffused portion of each of said two light pipes being so constructed and arranged to disperse the exiting light beam;

two light beam sensor means one for each of said two light pipes, each sensor being located relative to said diffused portion of a respective one of said two light pipes to receive the exiting light beam from said diffused portion of its respective light pipe; and said diffused portions of said two light pipes facing each other and said two light beam sensor means being located between said output ends of said two light pipes.

2. The split scan detector recited in claim 1, wherein said reflective means is a layer of reflective coating on said terminating end wall and said reflective wall.

3. The split scan detector recited in claim 1, wherein said reflective means is a reflective member attached to said terminating end wall and said reflective wall.

4. A split scan detector for detecting start of scan or end of scan in a raster output scanner comprising:

two flexible light pipes each having four walls extending in the longitudinal direction;

each light pipe being rectangular in cross section;

said rectangular cross section having two opposing sides which are substantially longer than the other two opposing sides with each of the sides corresponding to a respective one of said four walls;

one wall corresponding to one of the longer opposing sides of the rectangular cross section being a reflective wall and one wall corresponding to the other of the longer opposing sides of the rectangular cross section being an exit wall;

each light pipe having an input end and an output end;

said two light pipes each having a terminating end wall located at said output end and being connected to and transverse to said four walls and a light transmitting input end wall, for receiving a light beam, located at said input end and connected to and transverse to said four walls;

each of said two light pipes being positioned to receive a light beam at its input end and being so constructed and arranged to transfer the received light beam to said output end;

a portion of said exit wall on each light pipe being diffused at said output end;

on each of said light pipes, said terminating end wall and a portion of said reflective wall at said output end having reflective means;

on each of said light pipes, said diffused portion of said exit wall, said reflective means of said reflective wall and said reflective means of said terminating end wall being so constructed and arranged to reflect the received light beam toward said diffused portion to allow the received light beam to exit said light pipe through said diffused portion;

said diffused portion of each of said two light pipes being so constructed and arranged to disperse the exiting light beam;

two light beam sensor means one for each of said two light pipes, each sensor being located relative to said diffused portion of a respective one of said two light pipes to receive the exiting light beam from said diffused portion of its respective light pipe; and said reflective walls of said two light pipes facing each other at said output ends and said light pipes being located between said two light beam sensor means.

5. The split scan detector recited in claim 4, wherein said reflective means is a layer of reflective coating on said terminating end wall and said reflective wall.

6. The split scan detector recited in claim 4, wherein said reflective means is a reflective member attached to said terminating end wall and said reflective wall.

* * * * *